(No Model.)
I. P. HYDE.
SHOE KNIFE.
No. 430,651. Patented June 24, 1890.
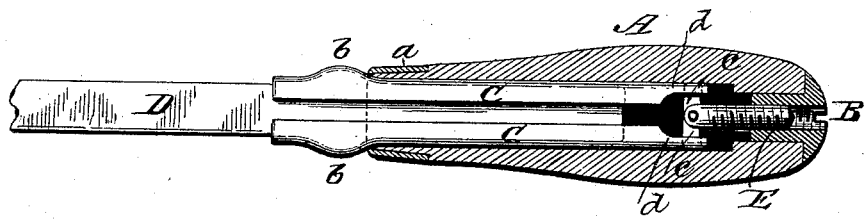
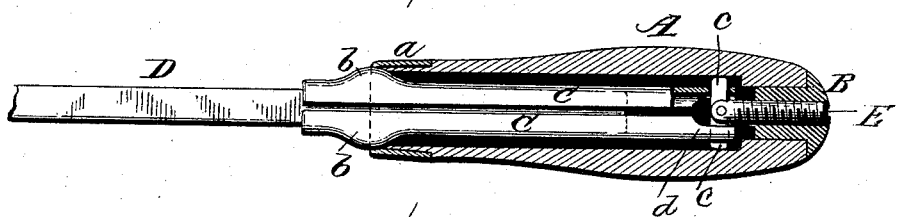
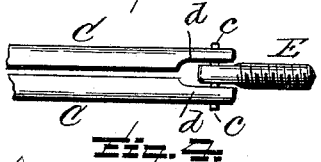
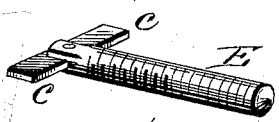
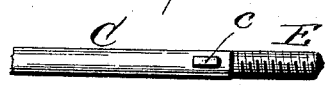
Witnesses
L. C. Hills
E. H. Bond
Inventor
Isaac P. Hyde,
per Chas. H. Fowler
Attorney

UNITED STATES PATENT OFFICE.

ISAAC P. HYDE, OF SOUTHBRIDGE, MASSACHUSETTS.

SHOE-KNIFE.

SPECIFICATION forming part of Letters Patent No. 430,651, dated June 24, 1890.

Application filed April 22, 1890. Serial No. 349,056. (No model.)

*To all whom it may concern:*

Be it known that I, ISAAC PERKINS HYDE, a citizen of the United States, residing at Southbridge, in the county of Worcester and State of Massachusetts, have invented certain new and useful Improvements in Knife-Blade Holders; and I do hereby declare that the following is a full, clear, and exact description of the same, reference being had to the annexed drawings, making a part of this specification, and to the letters of reference marked thereon.

Figure 1 of the drawings represents a side elevation of the knife-blade holder with the handle and operating screw-nut in section, the clamping bars or jaws being shown as expanded or spread apart in a lateral direction to receive the knife-blade. Fig. 2 represents a similar view with the clamping bars or jaws brought together against the edges of the blade to firmly hold it to the handle; Fig. 3, a detail view showing the manner of connecting the ends of the clamping bars or jaws to the operating-screw; Fig. 4, an edge view of the same; Fig. 5, a detail view in perspective of the operating-screw with its T-shaped head, and Fig. 6 an edge view of the same.

The present invention has relation to that class of tool-handles adapted for holding removable knife-blades designed for use in cutting out boot and shoe uppers, and in which are employed two grooved clamping bars or jaws for clamping and holding the blade between them.

It is the object of the invention to improve and simplify the means heretofore employed for expanding or contracting the clamping jaws or bars, whereby the same will be more effective in holding the knife-blade between them, and will securely and firmly retain blades of varying widths between the jaws or bars with equal pressure against the edges of the blade throughout the length of said jaws or bars, which objects are attained by the construction, substantially as shown in the drawings, and hereinafter described and claimed.

In the accompanying drawings, A represents the handle, of wood or other preferred material, and has fitted over its outer end a tapering ferrule $a$, the tapering form thereof more securely holding it in place upon the end of the handle. At the opposite end of the handle is the operating screw-nut B, and located within the handle are the grooved clamping bars or jaws C, having at their ends cam-shaped projections $b$, the knife-blade, as shown at D, being held between the jaws or bars, as shown in Figs. 1 and 2.

The several parts above described, with the exception of the tapering form of the ferrule, are of the ordinary construction in this class of knife-blade holders, and further description therefore is deemed unnecessary. It has been the aim heretofore to provide means whereby these grooved clamping bars or jaws could be expanded or contracted with an equal degree throughout their length, or from end to end, to adapt them to the varying widths of blade, and when brought together against the edges thereof will bear with equal pressure throughout the entire length of the jaws or bars. The means previously employed have their objections in that they add materially to the cost of manufacture, and, further, are liable to get out of order and are not always certain in their operation. The most simple means of attaining this end enhances materially the value of such a tool, both in durability and utility, and to accomplish this object I provide the usual screw E at its inner end with a T-shaped head, consisting of laterally-extending pins or arms, either flat, round, or any other preferred shape, connected to the screw or cast with it, as preferred, and the ends of the jaws or bars C have holes to correspond to the shape of the pins or arms, so that they can be loosely hung thereon, as shown, the interior walls of the handle preventing the ends of the jaws or bars from becoming disengaged with the pins or arms. It is preferred to reduce the width of the inner extremities of the jaws or arms, as shown at $d$, so that they will have greater length of play upon the pins or arms in holding or releasing the knife-blade.

In operation the screw-nut B is turned in the proper direction to distend the screw E, as shown in Fig. 2, when the jaws or arms C are forced forward and allowed to expand or separate in a lateral direction for the insertion of the knife-blade between them, after which the nut B is turned in the opposite direction, causing the screw E to farther enter the screw-nut, as shown in Fig. 2, and draw the jaws or bars farther into the handle.

The movement of the jaws or bars, as above described, will, by the action of the cam-shaped projections $b$, be forced against the edges of the knife-blade with equal pressure throughout their entire length, the manner of connecting the jaws or bars to the screw allowing a free lateral movement of the same in a direction to or from each other, as required.

Having now fully described my invention, what I claim as new, and desire to secure by Letters Patent, is—

A holder for knife-blades or other tools, consisting of a suitable handle, an adjustable screw having a T-shaped head and a screw for operating it, and a pair of grooved clamping jaws or bars having cam-shaped projections near their ends and loosely hung upon the lateral pins or arms forming the T-shaped head of the screw, the laterally-extending pins or arms being of greater length than the width of the inner ends of the grooved jaws, so that the latter will move bodily and uniformly throughout their length, substantially as and for the purpose set forth.

In testimony that I claim the above I have hereunto subscribed my name in the presence of two witnesses.

ISAAC P. HYDE.

Witnesses:
EDGAR M. PHILLIPS,
C. C. BRADFORD.